US012592495B2

(12) United States Patent
Bhaskar et al.

(10) Patent No.: US 12,592,495 B2
(45) Date of Patent: Mar. 31, 2026

(54) SYSTEMS AND METHODS FOR MITIGATING INTERFERENCE FROM SATELLITE GATEWAY ANTENNA

(71) Applicant: Hughes Network Systems, LLC, Germantown, MD (US)

(72) Inventors: Udaya Bhaskar, Germantown, MD (US); Stan Kay, Germantown, MD (US); Daniel Raymond Wendling, Germantown, MD (US)

(73) Assignee: Hughes Network Systems, LLC

( * ) Notice: Subject to any disclaimer, the term of this patent is extended or adjusted under 35 U.S.C. 154(b) by 129 days.

(21) Appl. No.: 18/789,175

(22) Filed: Jul. 30, 2024

(65) Prior Publication Data

US 2024/0388004 A1 Nov. 21, 2024

Related U.S. Application Data

(62) Division of application No. 17/842,602, filed on Jun. 16, 2022, now Pat. No. 12,080,945.

(60) Provisional application No. 63/334,450, filed on Apr. 25, 2022.

(51) Int. Cl.
*H01Q 17/00* (2006.01)
*H04B 7/185* (2006.01)

(52) U.S. Cl.
CPC ................................ *H01Q 17/001* (2013.01)

(58) Field of Classification Search
CPC .. H01Q 1/12; H01Q 1/22; H01Q 1/24; H01Q 1/52; H01Q 15/14; H01Q 17/00; H01Q 17/001; H01Q 19/19; H04B 7/024; H04B 7/155; H04B 7/185; H04B 7/195; H04B 7/204; H04B 10/27; H04B 15/00
See application file for complete search history.

(56) References Cited

U.S. PATENT DOCUMENTS

| | | | | | |
|---|---|---|---|---|---|
| 4,651,160 | A * | 3/1987 | Bornkast | H01Q 1/52 | 343/719 |
| 5,586,834 | A | 12/1996 | Weinberg | | |
| 5,731,777 | A * | 3/1998 | Reynolds | H01Q 17/001 | 342/4 |
| 6,856,787 | B2 | 2/2005 | Karabinis | | |
| 7,200,360 | B1 | 4/2007 | Chang | | |
| 8,193,975 | B2 * | 6/2012 | Zheng | H04B 7/086 | 342/377 |
| 8,670,705 | B2 * | 3/2014 | Karabinis | H04B 7/1851 | 455/12.1 |
| 9,685,712 | B2 * | 6/2017 | Paleta, Jr. | H01Q 19/193 | |
| 10,038,244 | B2 * | 7/2018 | Collignon | H01Q 21/0075 | |

(Continued)

*Primary Examiner* — Tho G Phan
(74) *Attorney, Agent, or Firm* — Spencer Fane, LLP

(57) ABSTRACT

Systems and methods for mitigating interference from a satellite gateway antenna are disclosed herein. In an embodiment, a method for mitigating interference from a satellite gateway antenna includes determining a power flux density radiation from the satellite gateway antenna in at least one direction in a horizontal plane, mounting at least one panel at an area in the at least one direction in the horizontal plane, orienting the at least one panel to have an azimuthal rotation relative to a look direction of the satellite gateway antenna in the horizontal plane, and orienting the at least one panel to have an upward tilt such that any reflection of horizontal rays of the power flux density radiation off of the at least one panel is not in the horizontal plane.

20 Claims, 10 Drawing Sheets

(56) References Cited

U.S. PATENT DOCUMENTS

| | | | |
|---|---|---|---|
| 10,903,898 | B1 | 1/2021 | Roy |
| 11,088,460 | B2 | 8/2021 | Sanjuan Flores |
| 11,916,652 | B2 | 2/2024 | Robson |
| 2023/0370158 | A1 | 11/2023 | Tran |

* cited by examiner (no panels)

(front panel at 10m, 0°)

(front panel at 15m, 0°)

SYSTEMS AND METHODS FOR MITIGATING INTERFERENCE FROM SATELLITE GATEWAY ANTENNA

CROSS REFERENCE TO RELATED APPLICATIONS

This application is a divisional of U.S. application Ser. No. 17/842,602, filed Jun. 16, 2022, entitled "Systems and Methods for Mitigating Interference from Satellite Gateway Antenna", which claims priority to U.S. Provisional Application No. 63/334,450, filed Apr. 25, 2022, entitled "Technique to Mitigate Interference from Satellite Gateway Antenna to 5G Base Station", the entire contents of each of which is incorporated herein by reference and relied upon.

FIELD OF THE INVENTION

The present disclosure is directed to systems and methods for mitigating interference from a satellite gateway antenna.

BACKGROUND INFORMATION

Satellite broadband internet services rely on satellite gateway antennas that provide feeder links between the terrestrial internet core network and satellites. These satellite gateway antennas transmit and receive over frequency bands that have been licensed by the Federal Communications Commission (FCC) for satellite services. Satellite gateway antennas operating in the Ka and V uplink bands share portions of the allocated frequency bands with mm-wave 5G services.

SUMMARY

The present disclosure provides systems and methods to reduce the radiation intensity from a transmitting satellite gateway antenna in specific directions of interest using panels that are physically separated from the satellite gateway antenna. Since the panels are not part of the satellite gateway antenna, these systems and methods can be used with existing operational satellite gateway antennas without requiring modifications to the satellite gateway antennas or their supporting structures. The size and shape of the panels, the position of the panels relative to the satellite gateway antenna, and the orientation of the panels relative to the satellite gateway antenna elevation angle are chosen such that the radiation intensity is reduced to below a threshold level in specific targeted directions, and any scattering of the radiation by the panels is redirected such that it has negligible impact on the radiation performance of the satellite gateway antenna. The disclosed systems and methods are effective in reducing the radiation level in any direction in a horizontal plane 360° around the satellite gateway antenna for elevation angles of interest.

The primary purpose of the systems and methods disclosed herein is to mitigate the interference from a satellite gateway antenna in the direction of a 5G base station. The potential for interference exists, for example, when the satellite gateway antenna is transmitting in the Ka and/or V uplink bands and the 5G base station is operating in the mm-wave band. The FCC has allocated portions of Ka and V bands on a shared basis to 5G and broadband satellite services. This requires a satellite gateway transmitter operating in the proximity of a 5G base station to not exceed a transmit power flux density (PFD) limit. FCC regulations require the PFD of the radiation from the satellite gateway antenna, as measured at a 10 meter height above ground level at the location of a 5G base station, to be less than $-77.6$ dBm/m$^2$/MHz.

Mitigation of such interference in certain directions is possible by a modification of the main reflector surface, feed horn or the sub reflector surface (in case of dual reflector antennas). For example, radiation intensity in the back lobe region can be reduced by extending the main reflector surface over a range of angles in certain directions. Reducing the feed taper can also result in the reduction of back lobe radiation (in case of single reflector geometry) or in the front lobe radiation (in case of dual reflector geometry). Modification of the sub reflector surface can also mitigate radiation in the front or in the back of the antenna. However, all such techniques require significant modifications to the antenna design, which is complicated especially for existing operational antennas. Some of these modifications, such as the modifications to the feed horn and subreflector, achieve interference mitigation at the cost of antenna performance. Modifications to the main reflector surface also impact the structural robustness of the (typically large) antenna structure to wind resistance, antenna steering, deicing, etc. In contrast, the technique disclosed herein requires no modification of the antenna support structure, the main reflector, the feed horn, or the subreflector. The disclosed technique can be employed with existing antennas since the additional panels can be physically separated from the antenna and supported by their own structure. This makes it attractive to deploy this solution for existing operational gateway antennas in cases where interference mitigation is needed due to the installation of a 5G base station.

In view of the state of the known technology, one aspect of the present disclosure is to provide a method for mitigating interference from a satellite gateway antenna. The method includes locating a satellite gateway antenna that shares a frequency band with a 5G service, determining that the satellite gateway antenna causes radiation that interferes with a base station operating using the 5G service, and mounting at least one panel to reduce the radiation in a direction of the base station operating using the 5G service.

Another aspect of the present disclosure is to provide a satellite communication system. The satellite communication system includes a satellite gateway antenna and at least one panel. The satellite gateway antenna is supported by a first supporting structure and located proximal to a base station operating using a 5G service. The at least one panel is supported by a second supporting structure separate from the first supporting structure of the satellite gateway antenna. The at least one panel is positioned and arranged to reduce radiation from the satellite gateway antenna in a direction of the base station.

Another aspect of the present disclosure is to provide another method for mitigating interference from a satellite gateway antenna. The method includes determining a power flux density radiation from a satellite gateway antenna in at least one direction in a horizontal plane, mounting at least one panel at an area in the at least one direction in the horizontal plane, orienting the at least one panel to have an azimuthal rotation relative to a look direction of the satellite gateway antenna in the horizontal plane, and orienting the at least one panel to have an upward tilt such that any reflection of horizontal rays of the power flux density radiation off of the at least one panel is not in the horizontal plane.

Also, other objects, features, aspects and advantages of the disclosed systems and methods will become apparent to those skilled in the art in the field of satellite communication systems from the following detailed description, which, taken in conjunction with the annexed drawings, discloses preferred embodiments of systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
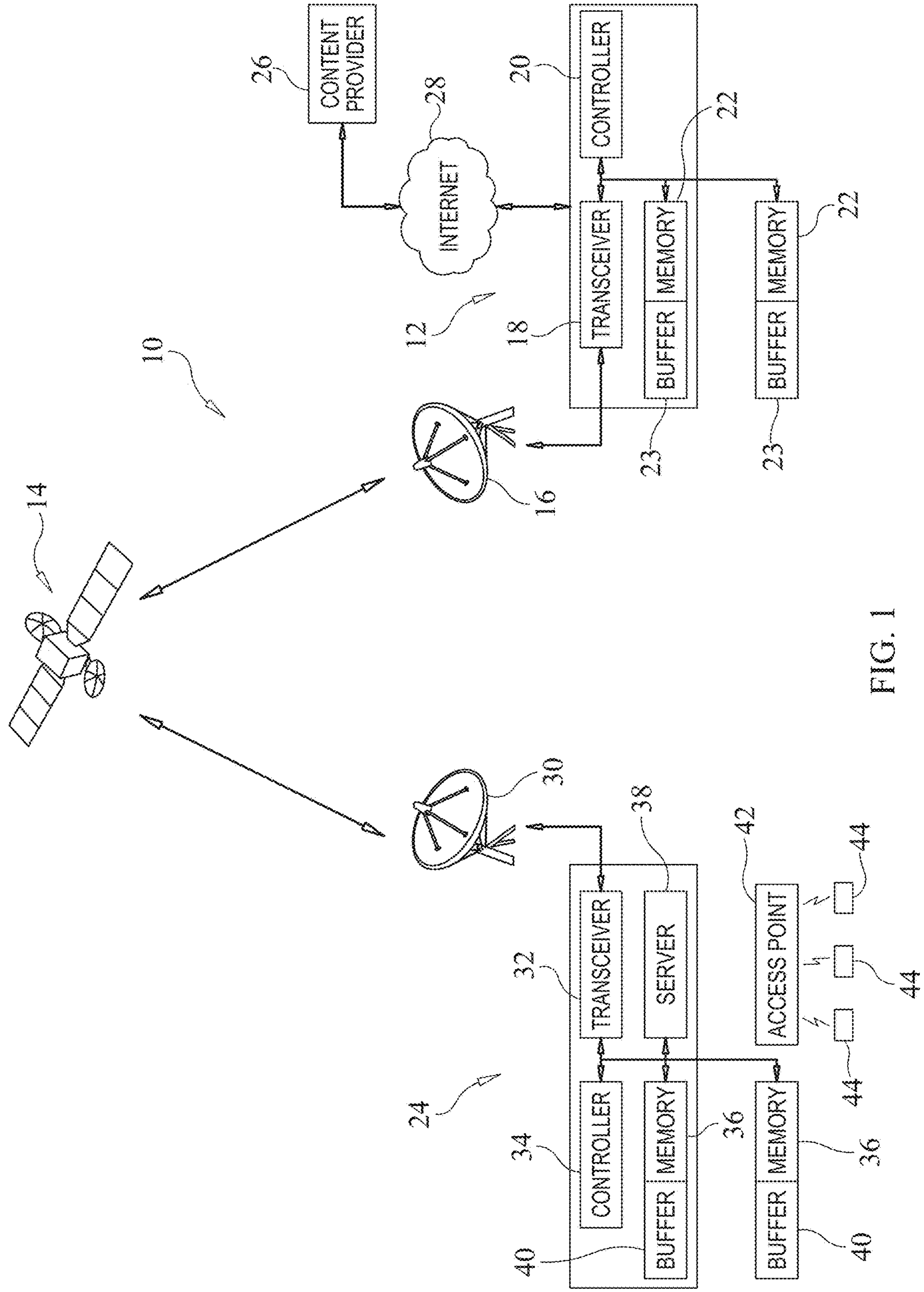
FIG. 1 illustrates an example embodiment of a satellite communication system in accordance with the present disclosure.

FIG. 1 illustrates an example embodiment of a satellite communication system 10. A satellite communication system 10 typically includes a gateway 12 that communicates with one or more orbiting satellites 14. The system 10 can include a plurality of gateways 12. A gateway 12 is configured to process data received via one or more orbiting satellites 14. Each gateway 12 can communicate with one or more orbiting satellites 14 via one or more satellite gateway antenna 16. Each gateway 12 can include, for example, a transceiver 18, a controller 20, one or more memory 22 and other types of equipment (not shown) such as amplifiers, waveguides and so on as understood in the art which enable communication between the gateway 12 and a plurality of terminals 24 via the orbiting satellites 14 and satellite gateway antennas 16. The one or more memory 22 can be, for example, an internal memory in the gateway 12, or other type of memory devices such as flash memory or hard drives with an external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art. Also, the memory 22 can include at least one buffer 23 which is configured to buffer, for example, data transmitted to or from a memory 22.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present disclosure.

The gateway 12 can include or be configured as a network management system, which, among other things, operates to communicate with remote sites, such as web content providers 26, via the Internet 28, cloud storage, or other communication networks as understood in the art. In addition, the gateways 12 can communicate with each other via, for example, the Internet 28 or other communication networks.

The gateway 12, the satellite 14 and the terminals 24 typically communicate with each other over a radio frequency link, such as a Ku-band link, a Ka-band link or any other suitable type of link as understood in the art, which can generally be referred to as a space link. Satellite gateway antennas 16 operating in the Ka and V uplink bands share portions of the allocated frequency bands with mm-wave 5G services. A 5G base station can also communicate via mm-wave 5G services and may be subject to interference from a satellite gateway antenna 16 depending on the distance between the two.

The satellite communication network 10 includes a plurality of terminals 24. As shown in FIG. 1, a terminal 24 typically includes an antenna dish 30, a transceiver 32, a controller 34, one or more memory 36, a local server 38 and other types of equipment (not shown) such as amplifiers, waveguides and so on as understood in the art which enable communication between the terminal 24 and one or more gateways 12 via one or more of the orbiting satellites 14. The antenna dish 30 enables the transmission of data between the terminal 24 and the satellite 14. A transceiver 32 can include, for example, an integrated satellite modem and any other suitable equipment which enables the transceiver 32 to communicate with one or more of the orbiting satellites 14 as understood in the art. The one or more memory 36 can be, for example, an internal memory in the terminal 24, or other type of memory devices such as a flash memory or hard drives with an external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Moreover, the one or more memory 36 can include at least one buffer 40 which is configured to buffer, for example, data transmitted to or from a memory 36.

The local server 38 can also include or communicate with an access point 42, such as a wireless application protocol (WAP) or any other suitable device, which enables the local server 38 to send and receive data to and from user devices 44. Such user devices 44 can include user devices such as desktop computers, laptop or notebook computers, tablets (e.g., iPads), smart phones, smart TVs and any other suitable devices as understood in the art. Thus, in an embodiment, the local server 38 is configured to collect data from user devices 44 for eventual transmission to the gateway 12 via the satellite 14 and/or send data to user devices 44 which has been received from the gateway 12 via the satellite 14. Naturally, the communications between the local server 38, the access point 42 and the data supplying devices 44 can occur over wireless connections, such as WiFi connections, as well as wired connections as understood in the art.

As with the controller 20 for a gateway 12, the controller 34 preferably includes a microcomputer with a control program that controls the terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the terminal 24 as appropriate, in a conventional manner. It will be apparent to those skilled in the art from this disclosure that the precise structure and algorithms for the controller 34 can be any combination of hardware and software that will carry out the functions of the present disclosure.

Figure 2:
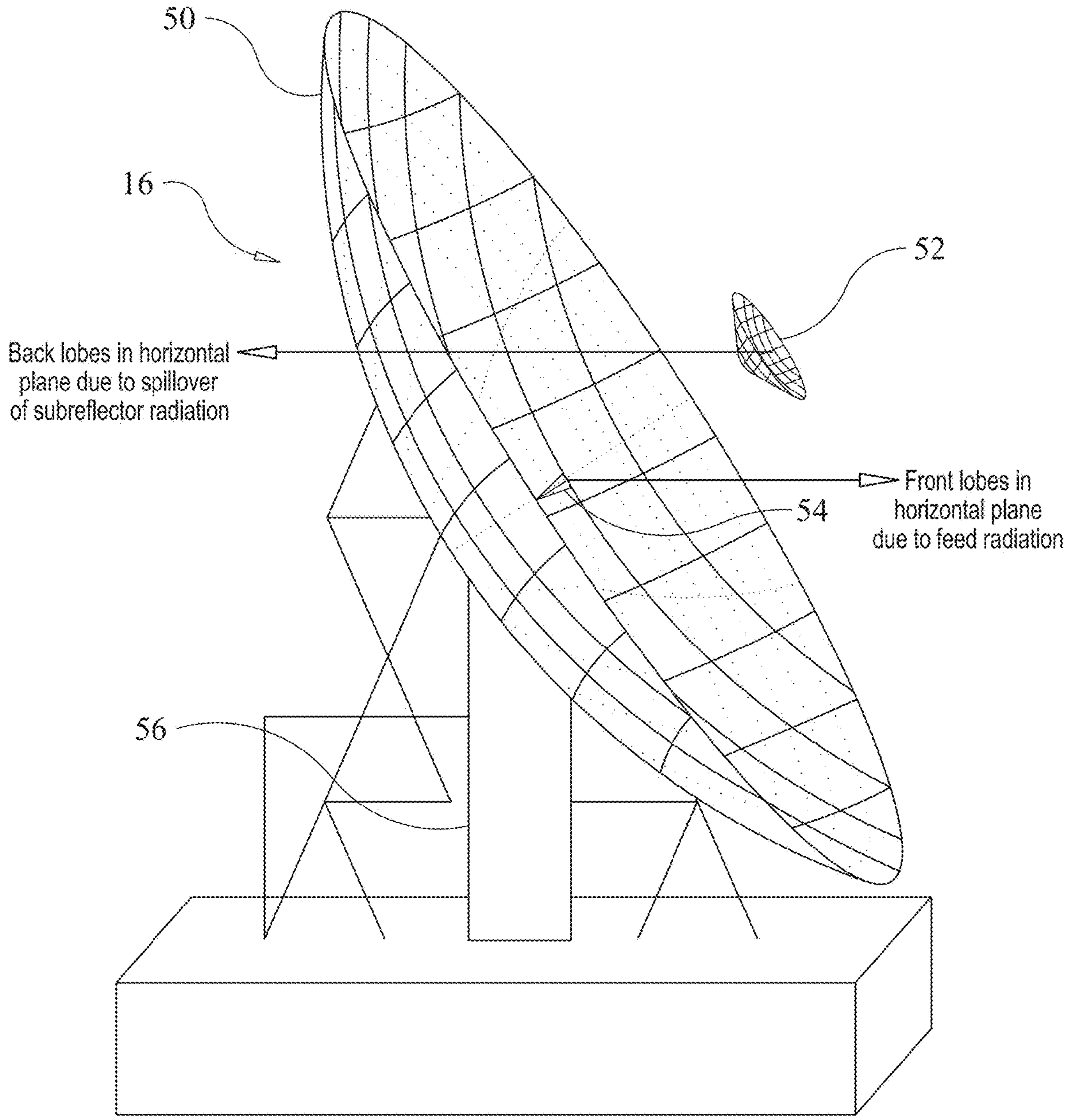
FIG. 2 illustrates an example embodiment of a satellite gateway antenna which can be used in the satellite communication system of FIG. 1.

FIG. 2 illustrates an example embodiment of a satellite gateway antenna 16 that produces a radiation pattern in the horizontal plane. The satellite gateway antenna 16 includes a main reflector 50, a sub reflector 52, a feed horn 54, and a support structure 56. The sub reflector 52 to is configured to direct radio waves into the main reflector 50 from a feed antenna located away from the primary focal point (structure holding sub reflector 52 in place not shown). The feed horn 54 is configured to couple a waveguide to the main reflector 50 for the reception or transmission of radio waves. The supporting structure 56 is configured to support the rest of the components (main reflector 50, sub reflector 52, feed horn 54 and/or other components) off of the ground in the appropriate position for the reception or transmission of radio waves. In the illustrated embodiment, the supporting structure 56 includes a supporting truss structure which includes a plurality of beams connected by nodes to create a rigid structure.

As illustrated in FIG. 2, the satellite gateway antenna 16 creates PFD radiation lobes in the horizontal plane in both the front (right in FIG. 2) and back (left in FIG. 2) directions. The front lobes in the horizontal direction are due to feed radiation from the feed horn 54. The back lobes in the horizontal plane are due to spillover radiation from the sub reflector 52 which passes the sides of the main reflector 50 in the horizontal plane. The PFD level due to radiation from a satellite gateway antenna 16 typically decreases with increasing distance from the satellite gateway antenna 16. The variation of PFD as a function of look angle from the satellite gateway antenna 16 depends on factors such as the antenna geometry, antenna elevation, transmit frequency, transmit power level and terrain conditions.

Figure 3:
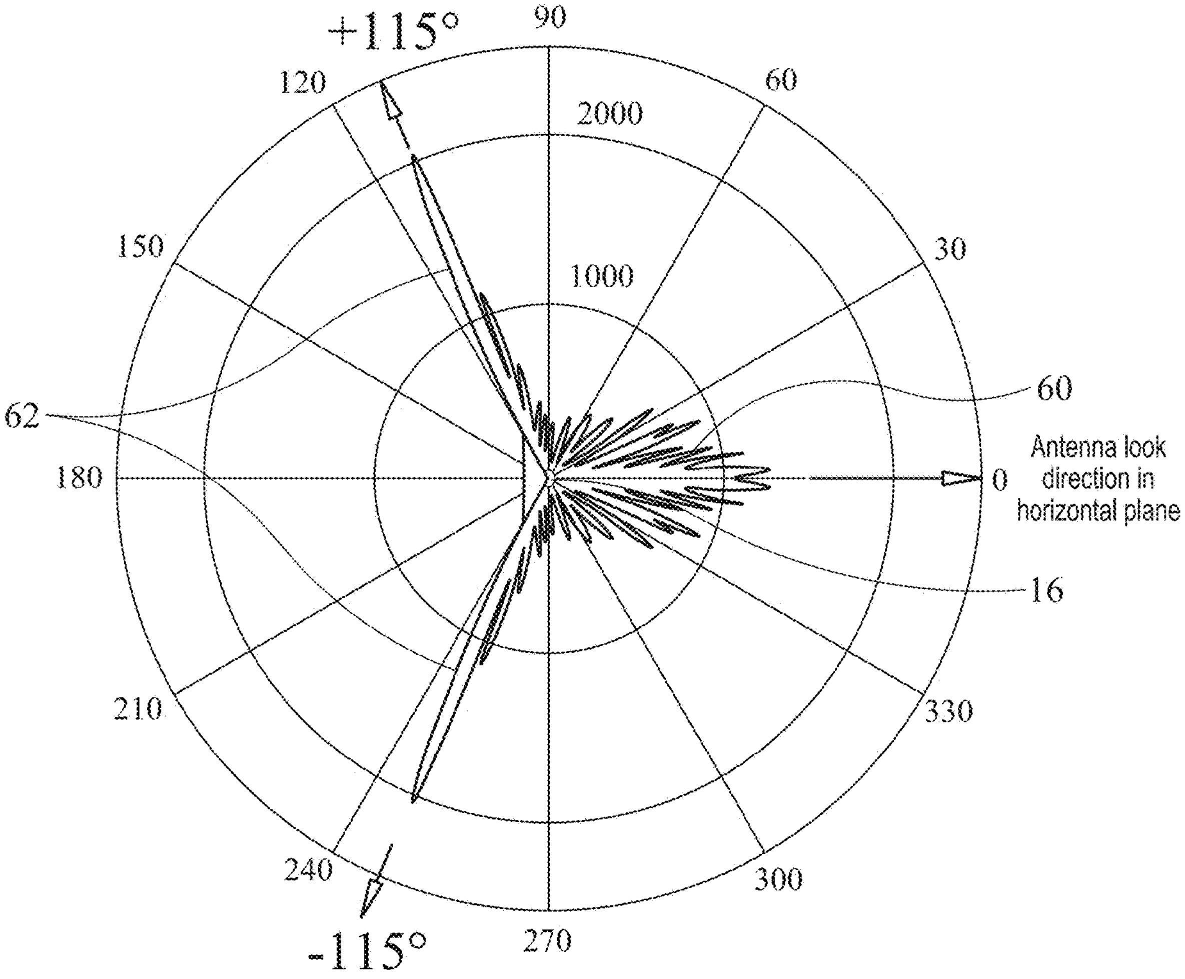
FIG. 3 illustrates an example embodiment of the power flux density (PFD) contour resulting from the satellite gateway antenna of FIG. 2 in a horizontal plane.

FIG. 3 illustrates the PFD contour of the satellite gateway antenna 16 of FIG. 2 in the horizontal plane. Here, the horizontal plane is 10 meters above ground where the satellite gateway antenna 16 is placed. In FIG. 3, the look direction in the horizontal plane is the direction from the front of the satellite gateway antenna 16 and is oriented at 0°. FIG. 3 illustrates the PFD front lobes 60 and the back lobes 62 from FIG. 2 in more detail. The front lobes 60 are mainly due to the direct radiation (co-pol) from the feed horn 54. The back lobes 62 are mainly due to the spillover of the sub reflector 52 radiation (x-pol) past the edges on both sides of the main reflector 50. In the example embodiment of FIG. 3, the PFD contour is computed from a 10 meter satellite gateway antenna 16, at an elevation angle of 32.8 degrees and transmitting at 28 GHZ, which is part of the spectrum shared with 5G. The PFD is computed based on the sum of far field co-pol and x-pol powers, assuming a nominal transmit power required to close the feeder uplink to a Geosynchronous Equatorial Orbit (GEO) satellite under clear sky conditions. In the illustrated embodiment, the PFD contour is a plot of the distance (in meters) from the antenna 16 at which the PFD drops to −77.6 dBm/m2/MHz, as measured 0-360° around the antenna 16, on a horizontal plane 10 meters above ground level, assuming a flat terrain. FCC regulations require the PFD of the radiation from the satellite gateway antenna 16, as measured at a 10 meter height above ground level at the location of a 5G base station, to be less than −77.6 $dBm/m^2/MHz$.

A problem can arise when a terrestrial cellular 5G base station that operates using 5G is located within the PFD contour of a satellite gateway antenna 16. From FIG. 3, it can be seen that the "stay out" distance within the PFD contour is highly variable as a function of the look direction in the horizontal plane. In particular, the back lobes 62 at +115° and −115° extend to nearly 2 kilometers. The front lobes also extend to >1 kilometer in a range of directions near 0°. The interference level to a 5G base station exceeds the limit of −77.6 dBm/m2/ MHz if it is located inside the PFD distance contour. In such a case, the systems and methods of the present disclosure situate one or more mitigation panel 102 at the appropriate location and orientation to reduce the PFD to a value below the limit at the 5G base station.

Figure 4A:
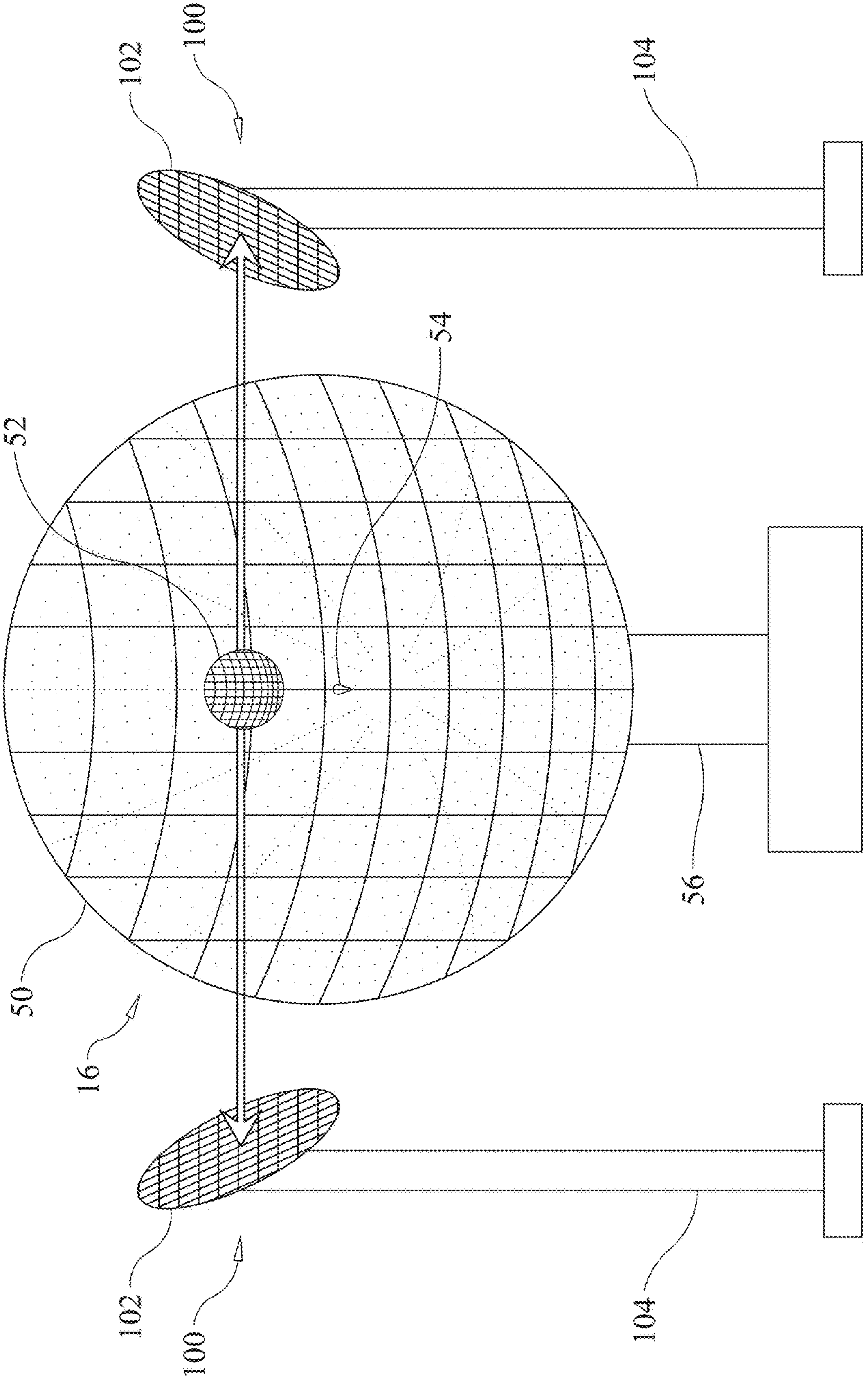
FIGS. 4A and 4B illustrate an example embodiment of a satellite gateway antenna in combination with panels in accordance with the present disclosure.
Figure 4B:
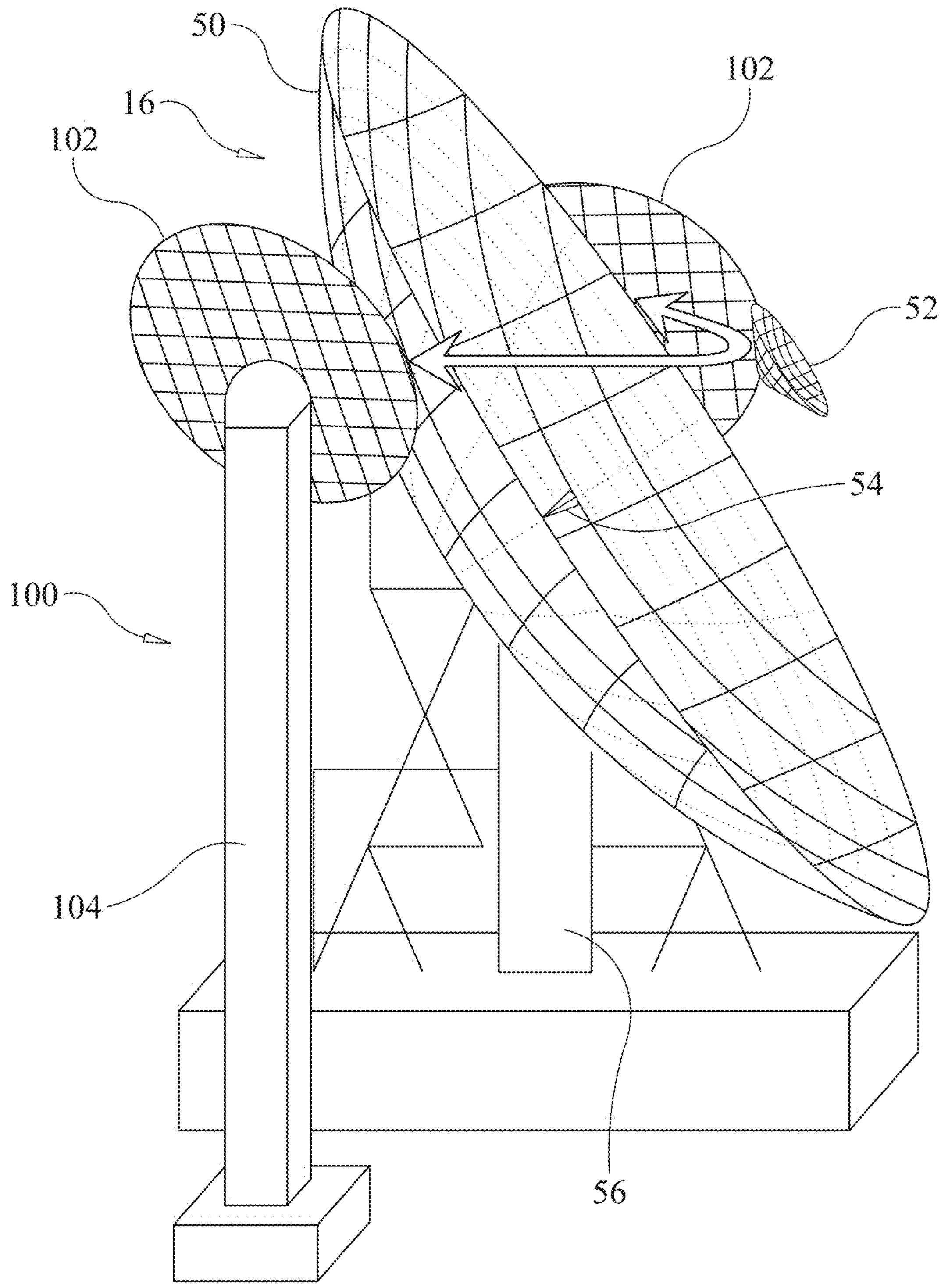

The mitigation technique disclosed herein uses one or more panel structure 100 to reduce the radiation intensity in the directions where a 5G base station is or may be located. FIGS. 4A and 4B illustrate an example embodiment of a satellite communication system 10 using two panel structures 100. In the illustrated embodiment, each panel structure 100 includes a panel 102 and a support structure 104. As illustrated, the panel structures 100 are standalone in comparison to the satellite gateway antenna 16, using their own support structure 104 that is separate from the support structure 56 of the satellite gateway antenna 16. In the illustrated embodiment, the panels 102 are not electrically or mechanically attached to the satellite gateway antenna 16 or its support structure 56.

The size, shape, location, azimuth, and elevation angles of each panel 102 can be designed on a case-by-case basis, based on the look angle of the satellite gateway antenna 16 and the distance between the 5G base station and the satellite gateway antenna 16. In an embodiment, a panel 102 can include a reflective material. In an embodiment, a panel 102 can include an absorptive material. In an embodiment, a panel 102 can include a flat plate. In an embodiment, a panel 102 can include a curved surface (for e.g., paraboloids). In an embodiment, a panel 102 can include a circular rim. In an embodiment, a panel 102 can include a polygonal rim. It has been determined that all such panels, when sized, placed, and oriented appropriately, are effective in providing the desired reduction in the PFD level in a desired direction. In the illustrated embodiment shown in FIGS. 4A and 4B, the panels 102 are formed as a flat plates with circular rims.

The support structure 104 of each panel structure 100 is configured to support a respective panel 102 off of the ground in the appropriate position. The support structure 104 can include a support beam, support truss, or other rigid structure sufficient to secure the panel 102 in its desired orientation. In the illustrated embodiment, the support structure 104 is physically separate from the support structure 56 of the satellite gateway antenna 16, enabling the panel structure 100 to be physically separate from the satellite gateway antenna 16 so that the panel structure 100 can be erected at the location of the satellite gateway antenna 16 without any modifications or attachments to the satellite gateway antenna 16.

Figure 6:
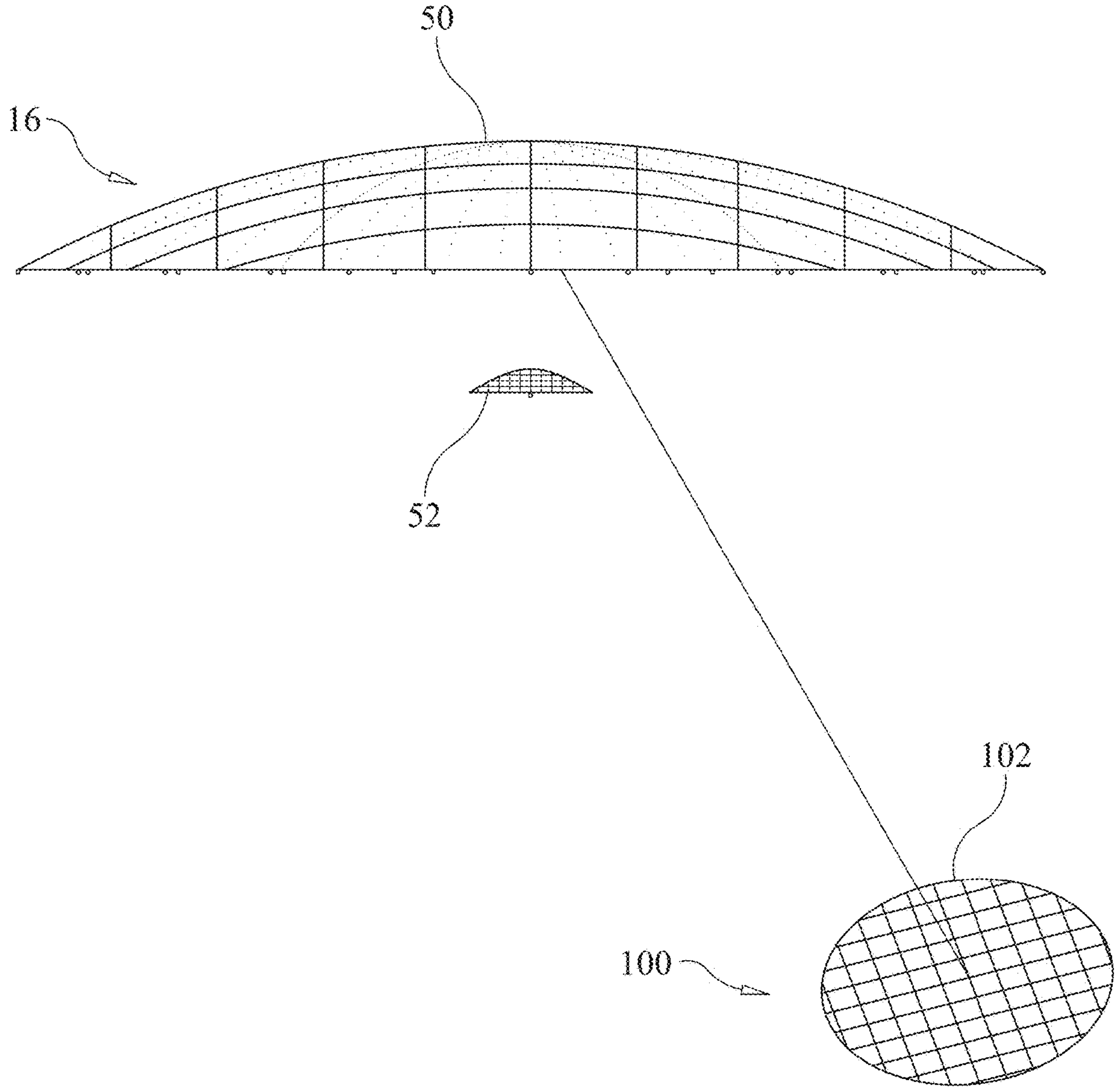
FIG. 6 illustrates another example embodiment of a satellite gateway antenna in combination with a panel in accordance with the present disclosure.

FIGS. 4A and 4B illustrate a satellite communication system 10 in which two panels 102 have been placed on respective sides of the satellite gateway antenna at positions about +115° and −115° with reference to an antenna look direction of 0°. The PFD radiation directed towards the panels 102 is shown by the arrows. The two panels 102 are aligned to mitigate the PFD radiation from the left and right back lobes 62 illustrated in FIG. 3. Thus, the two panels 102 shown in FIGS. 4A and 4B are back panels 102 designed to mitigate radiation behind the satellite gateway antenna 16. With reference to FIG. 3, the area behind the satellite gateway antenna 16 is the area extending counterclockwise from 90° to 270°. FIG. 6 illustrates an example front panel 102 designed to mitigate radiation in front of the satellite gateway antenna 16 (the area extending clockwise from 90° to 270° in FIG. 3) and is discussed in more detail below.

There are several considerations in designing and positioning front or back panels 102 to mitigate radiation. The position of a back panel 102 is determined such that horizontal rays emanating from the common focal point of the main reflector 50 and sub reflector 52 towards a target 5G base station are intercepted. Since the main reflector 50 illumination (by the sub reflector 52) drops off away from the edge of the main reflector 50, the spillover rays closer to the edge of the main reflector 50 result in a higher PFD. The position of a back panel 102 is determined considering both the direction at which PFD reduction is desired and the direction of the spillover rays at the edge. The goal is for the panel 102 to intercept the radiation over this range of directions as close to the panel 102 center as possible. In the case where the main reflector 50 is illuminated directly from a feed horn 54 (i.e., single reflector geometry), the same considerations apply, except in this case the horizontal rays emanating from the phase center of the feed horn 54 are taken into consideration.

The position of a front panel 102 is determined such that horizontal rays emanating from the phase center of the feed horn 56 towards the target 5G base station are intercepted. The goal is for the panel 102 to intercept the radiation in this direction as close to the panel 102 center as possible. In the case where the main reflector 50 is illuminated directly from a feed horn 54 (i.e., single reflector geometry), the PFD in the front lobes 60 is primarily due to radiation from the main reflector 50. In this case, a front panel 102 is positioned such that the horizontal rays in the direction of the 5G base station are approximately centered on the panel 102.

The panel 102 orientation can be specified in terms of two rotation angles: (1) phi (an azimuthal rotation relative to the antenna look direction in the horizontal plane); and (2) theta (elevation rotation relative to horizontal plane). Phi is determined such that the plane of the panel 102 is approximately orthogonal to the rays to be intercepted. This presents the largest area of interception to the rays that must be suppressed and maximizes the degree and the angular range of suppression. Theta is an upward tilt, which is necessary to ensure that any reflection of horizontal rays from the panel is not in the horizontal plane. If the panel 102 is vertical with respect to ground (i.e., theta=0), a reflected horizontal ray will also be in the horizontal plane, which is undesirable. So theta is a tilt of the panel 102 to direct the reflected rays away from the horizontal plane. It is also preferable to have theta>0 to direct the reflected rays away from the ground since ground reflections are terrain dependent and can be unpredictable. A small positive value of theta (e.g., theta=20°) gives satisfactory results. If the panel 102 is a perfectly absorbing panel, theta can be 0°. In an embodiment, both phi and theta are >0.

The size of a panel 102 can vary depending on the application. The size of a panel 102 (e.g., radius for circular rims) is determined based on the range of angles over which suppression is required and the degree of suppression needed. The reduction in PFD level and the range of angles over which reduction is achieved increases with increasing panel size.

Figure 5:
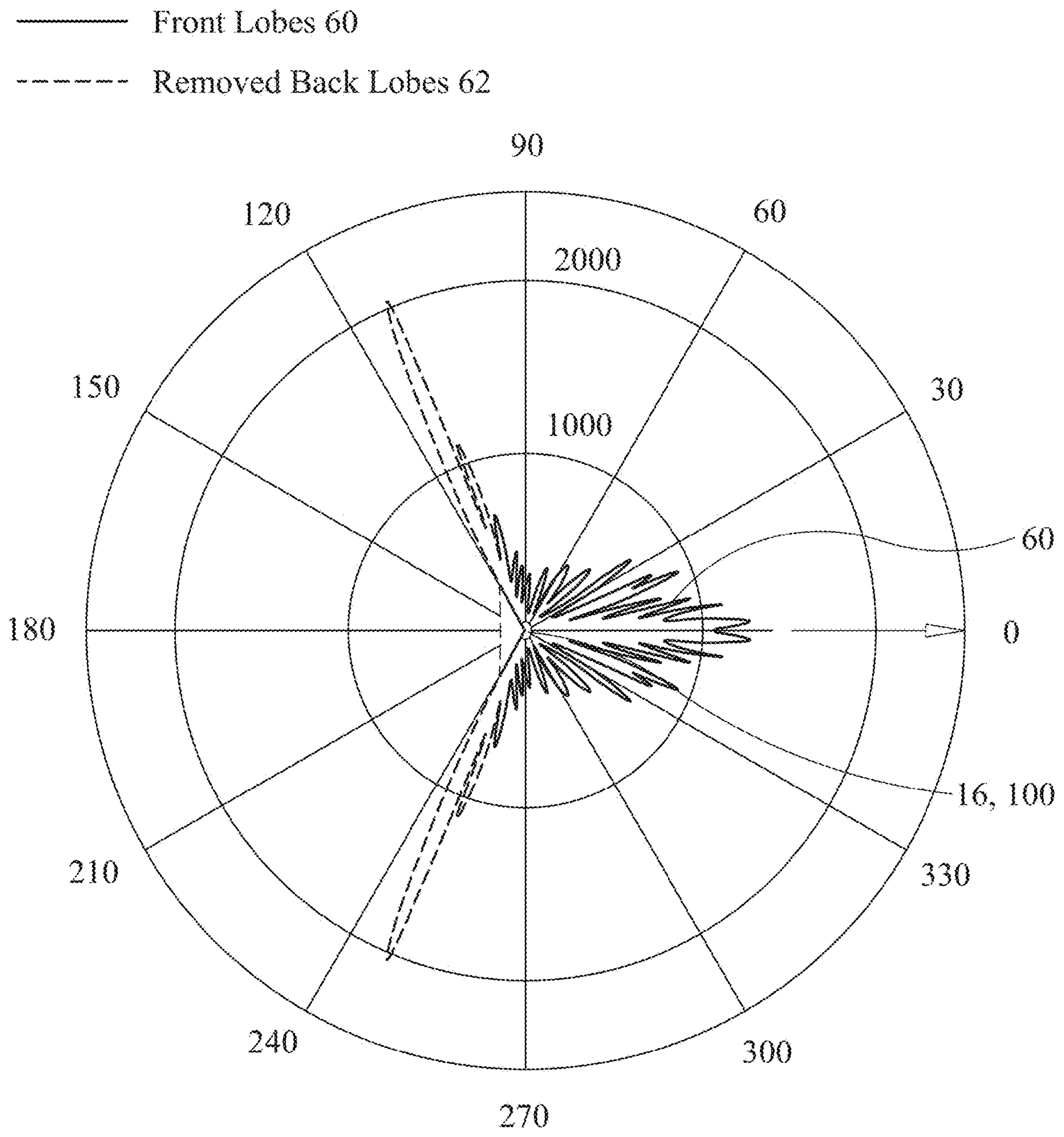
FIG. 5 illustrates an example embodiment of the PFD contour resulting from the satellite gateway antenna and panels of FIGS. 4A and 4B in a horizontal plane.

FIG. 5 shows the performance of the back panels 102 in FIGS. 4A and 4B in reducing the two back lobes at +115° and −115° that are shown in FIG. 3. FIG. 5 compares the PFD contour of the satellite gateway antenna 16 without mitigating panels 102 as seen in FIG. 2 to the satellite gateway antenna 16 with the mitigating back panels 102 shown in FIGS. 4A and 4B (removing back lobes 62). As seen in FIG. 5, the panels 102 in FIGS. 4A and 4B are effective in reducing the PFD levels behind the satellite gateway antenna 16 to significantly smaller values.

One or more panel 102 can also be used in front of the antenna 16 to reduce front lobe 60 radiation in specific directions. FIG. 6 shows an example of a front panel 102 placed at a bearing of approximately 20° and at a distance of 15 meters in front of the satellite gateway antenna 16 of FIG. 2 to suppress a front lobe 60. This panel was designed to reduce the PFD at a target 5G base station assumed to be at approximately 20° in the region of the front lobe 60 in FIG. 3. The front panel 102 in FIG. 6 is a circular flat plate with a diameter of 3 meters, placed at 15 meters from the satellite gateway antenna 16 and at a height of 8 meters. It has been determined that the panel 102 is effective in reducing the PFD to an acceptable level in the desired direction.

Figure 7A:
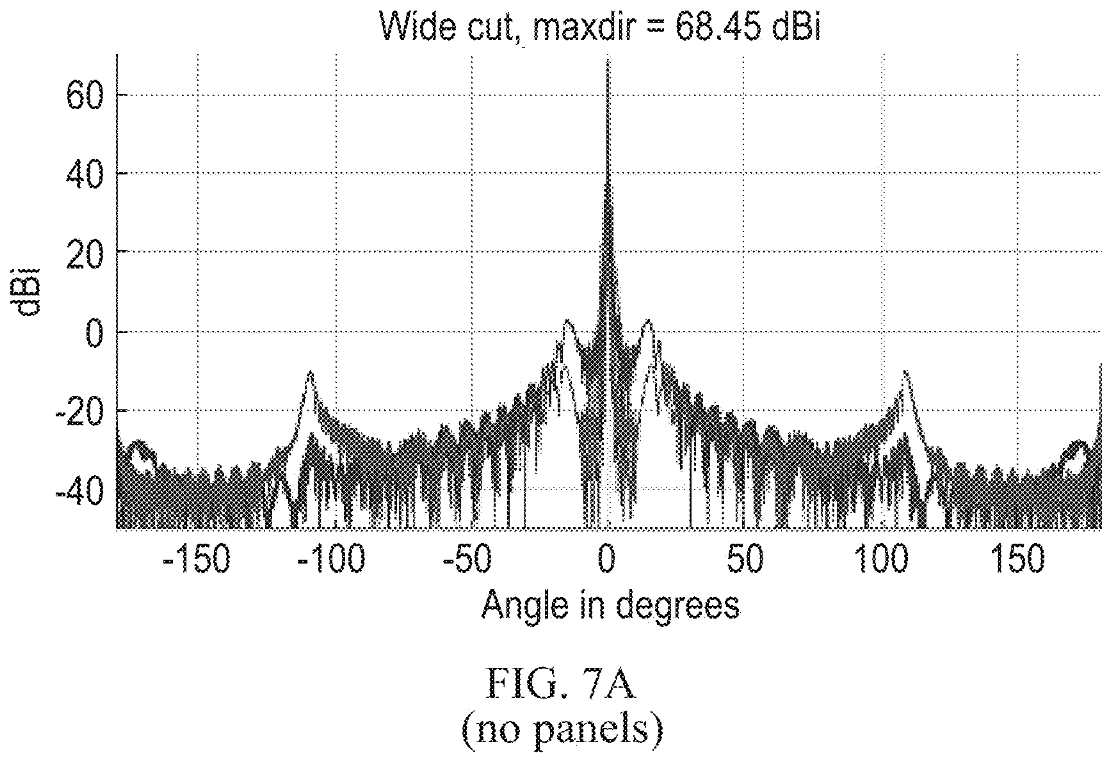
FIGS. 7A-7C illustrate an example of the effect of the distance between a satellite gateway antenna and a panel placed in accordance with the present disclosure.
Figure 7B:
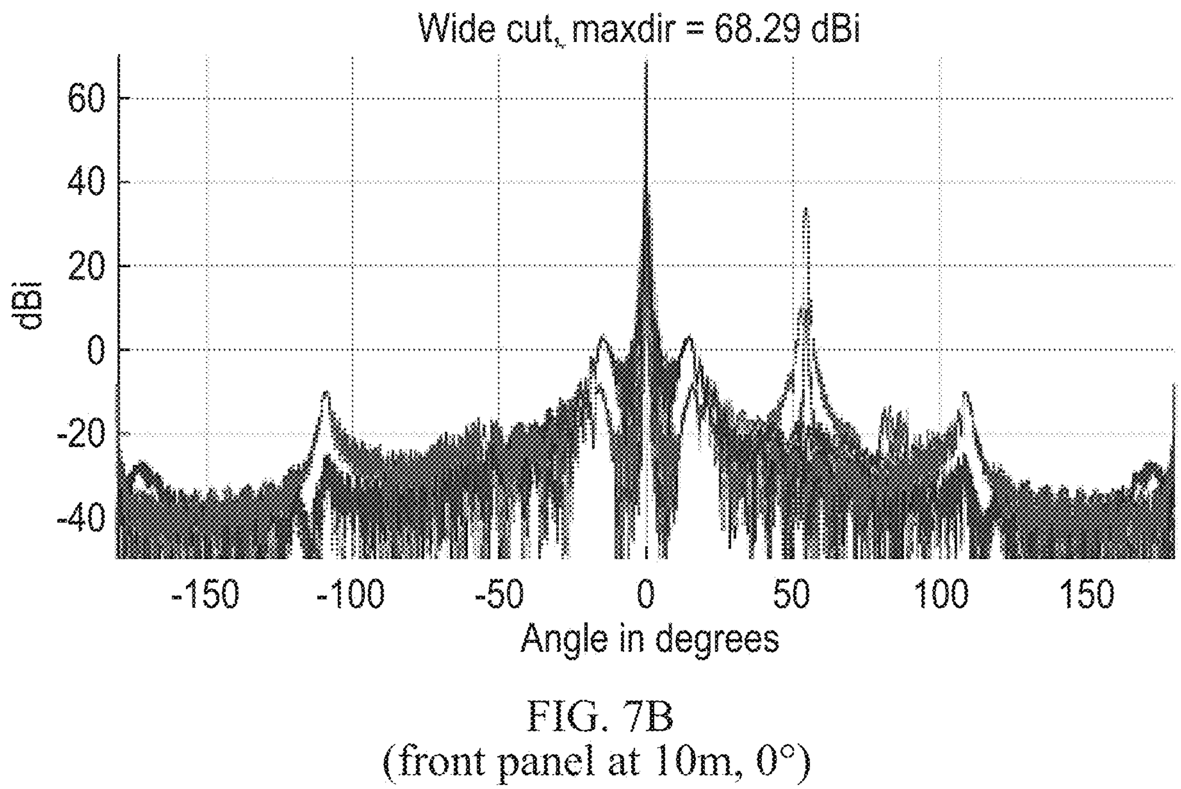
Figure 7C:
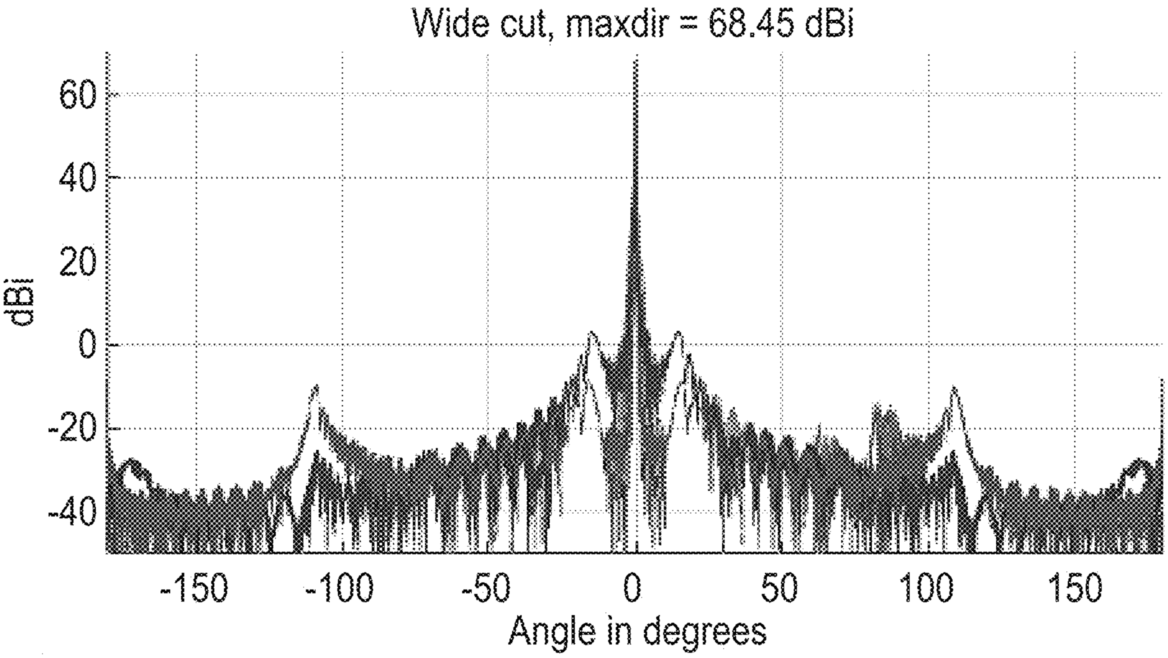

If a front panel 102 is placed too close to the satellite gateway antenna 16 it can degrade the performance of the satellite gateway antenna 16. This is because the front panel 102 distorts the near field and prevents the proper formation of the far field pattern. As a result, the main front lobe 60 is distorted, spurious sidelobes appear, and the peak directivity is reduced. FIGS. 7A to 7C show the effect of the distance of the front panel 102 on the satellite gateway antenna 16 main lobe and side lobes. These are elevation cuts of co-pol and x-pol patterns with azimuth over 0° to 180° in 10° steps, resulting in a superposition of 36 plots. The purpose is to study any distortion of the main lobe or side lobes over the entire range of elevation and azimuth angles. FIG. 7A illustrates antenna directivity patterns with no panels, showing a well behaved symmetric main lobe and low side lobe structure at all elevation cuts and a peak directivity of 68.45 dB. It is desirable to maintain this performance even in the presence of panels 102. FIG. 7B illustrates the effect of placing a 3 meter diameter circular flat plate panel 102 at a distance of 10 meters directly in front of the satellite gateway antenna 16 (i.e., at a bearing of 0°). This results in spurious side lobes at 55° and a peak directivity loss of 0.16 dB. When the front panel 102 is moved to 15 meters at the same bearing, the antenna patterns are mostly restored as seen in FIG. 7C. The peak directivity is the same as the FIG. 7A case without panels 102. The level of spurious side lobes is quite low and not problematic. This example shows that when it is necessary to reduce the PFD in front lobes 60, the distance between the satellite gateway antenna 16 and panel 102 should be carefully selected, particularly when the bearing angle at which suppression is desired is close to 0°.

The above examples have presented the performance for flat circular panels 102 that are perfect reflectors. The performance with panels 102 with other sizes and electrical properties has also been considered. Paraboloidal panels 102 and flat panels 102 with polygonal rims have been tested and found to provide similar results as flat circular panels of comparable sizes. The same general considerations in the placement and orientation also apply to these variations. Further, panels 102 which are perfect absorbers have also provided similar performance in terms of PFD level reduction. Absorber panels 102 have the additional advantage that they do not reflect the incident radiation and consequently do not cause spurious sidelobes.

Figure 8:
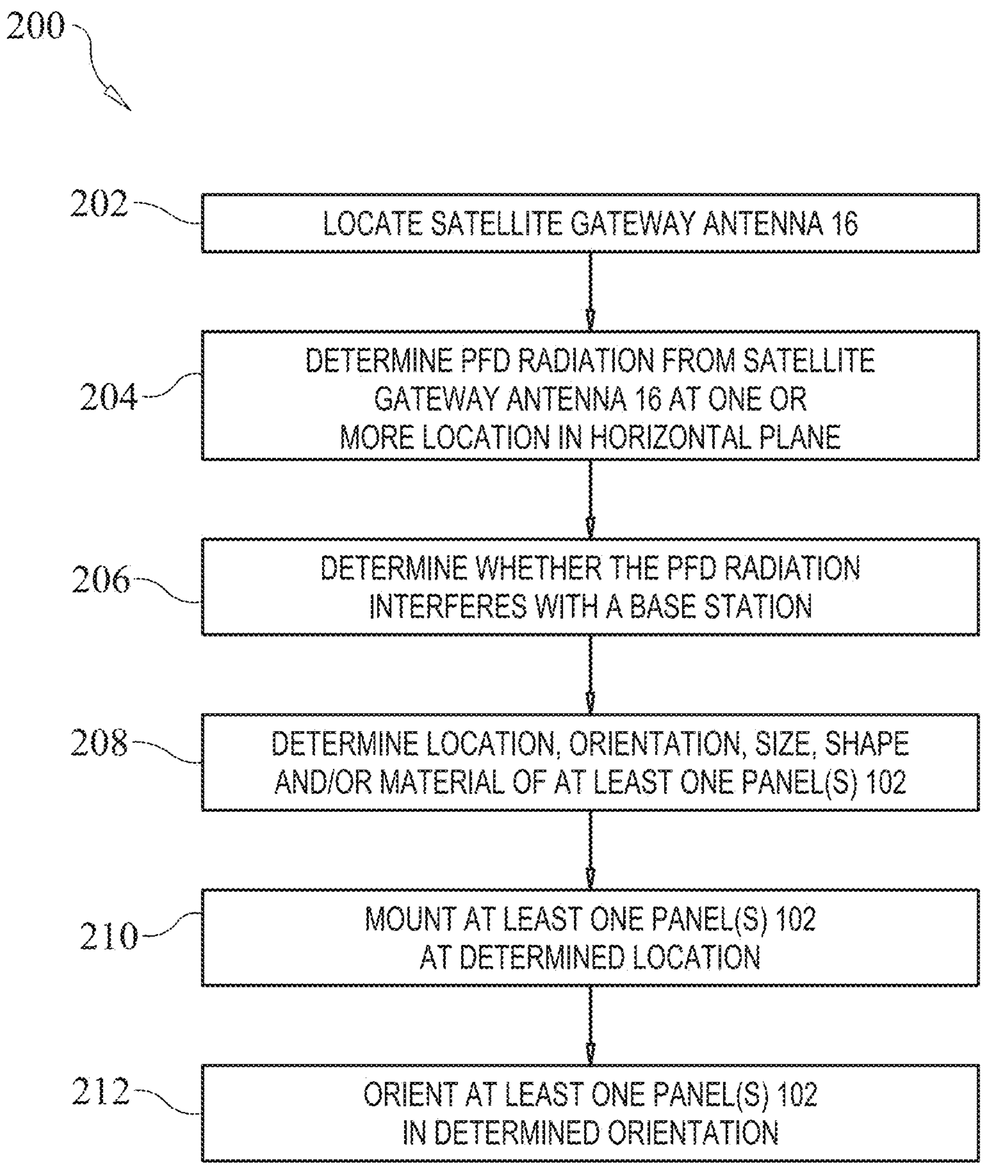
FIG. 8 illustrates an example embodiment of a method for mitigating interference from a satellite gateway antenna in accordance with the present disclosure.

FIG. 8 illustrates an example embodiment of a method 200 for mitigating interference from a satellite gateway antenna in accordance with the present disclosure. It should be understood that some of the steps described herein can be reordered or omitted without departing from the spirit or scope of the method 200.

At step 202, a satellite gateway antenna 16 is located. The satellite gateway antenna 16 can be an existing satellite gateway antenna 16 that shares a frequency band with a 5G service. For example, the satellite gateway antenna 16 can be an existing satellite gateway antenna 16 that transmits in the Ka and/or V uplink bands.

At step 204, the PFD radiation from the satellite gateway antenna 16 is determined. More specifically, the PFD radiation from the satellite gateway antenna 16 is determined in at least one direction in a horizontal plane. In an embodiment, the direction is the direction of a terrestrial cellular 5G base station operating using a 5G service in relation to the satellite gateway antenna 16. In an embodiment, determining the PFD radiation from the satellite gateway antenna 16 includes determining the PFD radiation in an area including a base station using a 5G service. In an embodiment, the PFD radiation is determined in multiple directions from the satellite gateway antenna 16 in the horizontal plane, for example, for 360° around the satellite gateway antenna 16 in the horizontal plane. In an embodiment, this step includes creating a PFD contour of an area surrounding the satellite gateway antenna 16, for example, as shown in FIGS. 3 and 5.

At step 206, it is determined whether the PFD radiation determined at step 204 interferes with a base station. More specifically, it is determined whether the PFD radiation determined at step 204 interferes with a base station operating using a 5G service. In an embodiment, determining whether the PFD radiation interferes with a base station includes determining whether a base station is within the PFD contour of an area surrounding the satellite gateway antenna 16, for example, as shown in FIGS. 3 and 5. In an embodiment, determining whether the PFD radiation interferes with a base station includes determining that the PFD in the area of the base station exceeds a limit of −77.6 dBm/m2/MHz.

At step 208, the location, orientation, size, shape and material of at least one panel 102 is determined. More specifically, the location, orientation, size and shape are determined to mitigate the PFD radiation from the satellite gateway antenna 16 towards a base station. In an embodiment, the location of at least one panel 102 can be determined to be in the direction of the base station from the satellite gateway antenna 16 in the horizontal plane. In an embodiment, the distance of at least one panel 102 from the satellite gateway antenna can be determined so as not to degrade the performance of the satellite gateway antenna 16, for example, using an analysis similar to that shown in FIGS. 7A to 7B. In an embodiment, determining the orientation of a panel 102 includes determining that the panel 102 should have an azimuthal rotation relative to a look direction of the satellite gateway antenna in a horizontal plane, as described above. In an embodiment, determining the orientation of a panel 102 includes determining that the panel 102 should have an upward tilt such that any reflection of horizontal rays of the radiation off of the panel 102 is not in a horizontal plane, as described above. In an embodiment, determining the size of a panel 102 includes, for example, determining the range of angles over which suppression is required and the degree of suppression needed, as described above. In an embodiment, determining the shape of a panel 102 includes, for example, determining whether the panel 102 should be flat or curved or have a circular or polygonal rim. In an embodiment, determining the material of a panel 102 include, for example, determining whether the panel 102 should have a reflective or an absorptive material, as described above.

At step 210, at least one panel 102 is mounted at the determined location. In an embodiment, mounting a panel 102 includes positioning the panel 102 a distance from the satellite gateway antenna 16 using a support structure 104 separate from that of the satellite gateway antenna 16. More specifically, in an embodiment, this step includes mounting a panel 102 separately from the satellite gateway antenna 16 at an area in at least one direction from the satellite gateway antenna 16 in the horizontal plane. In an embodiment, this step includes mounting at least one panel 102 on a side of the satellite gateway antenna 16 to reduce a back lobe of radiation extending behind the satellite gateway antenna 16, as described above. In an embodiment, this step includes mounting two panels 102 on opposite sides of the satellite gateway antenna 16 to reduce back lobes of radiation extending behind the satellite gateway antenna 16 on the opposite sides of the satellite gateway antenna 16, as described above. In an embodiment, this step includes mounting a panel 102 in front of the satellite gateway antenna 16 to reduce a front lobe of radiation extending in front of the satellite gateway antenna 16 at or near a look direction of the satellite gateway antenna 16, as described above. In an embodiment, this step includes mounting multiple panels 102 in front of the satellite gateway antenna 16 to reduce front lobes of radiation extending in front of the satellite gateway antenna 16 at or near a look direction of the satellite gateway antenna 16, as described above.

At step 212, at least one panel 102 is oriented to mitigate the PFD radiation from the satellite gateway antenna 16. The panel 102 can be oriented at the same time it is mounted. In an embodiment, this includes orienting at least one panel 102 to have an azimuthal rotation relative to a look direction of the satellite gateway antenna 16 in the horizontal plane, as described above. In an embodiment, this includes orienting at least one panel 102 to have an upward tilt such that any reflection of horizontal rays of the power flux density radiation off of the panel 102 is not in the horizontal plane.

In an embodiment, once the method has been performed, the satellite communication system 10 includes a satellite gateway antenna 16 and at least one panel 102 positioned and arranged to reduce radiation from the satellite gateway antenna 16 in a direction of a base station using a 5G service. In an embodiment, the satellite gateway antenna 16 is supported by a first supporting structure 56 and located proximal to the base station, and the at least one panel 102 is supported by a second supporting structure 104 separate from the first supporting structure 102 of the satellite gateway antenna 16. In an embodiment, the at least one panel 102 includes a panel 102 located on a side of the satellite gateway antenna 16 to reduce a back lobe of radiation extending behind the satellite gateway antenna 16, as seen for example in FIGS. 4A and 4B. In an embodiment, the at least one panel 102 includes two panels 102 located on opposite sides of the satellite gateway antenna 16 to reduce back lobes of radiation extending behind the satellite gateway antenna 16 on the opposite sides of the satellite gateway antenna 16, as seen for example in FIGS. 4A and 4B. In an embodiment, the at least one panel 102 includes a panel 102 in front of the satellite gateway antenna 16 to reduce a front lobe of radiation extending in front of the satellite gateway antenna 16 at or near a look direction of the satellite gateway antenna 16, as seen for example in FIG. 6. In an embodiment, the at least one panel 102 is positioned and arranged to be orthogonal to rays of the radiation in the direction of the base station, as described above. In an embodiment, the at least one panel 102 is positioned and arranged to have an upward tilt such that any reflection of horizontal rays of the radiation off of the at least one panel 102 is not in a horizontal plane, as described above. In an embodiment, the at least one panel 102 is positioned and arranged to have an azimuthal rotation relative to a look direction of the satellite gateway antenna 16 in a horizontal plane, as described above. In an embodiment, the at least one panel 102 is not electrically or mechanically attached to the satellite gateway antenna 16.

The embodiments described herein provide improved systems and methods for mitigating interference from a satellite gateway antenna. These systems and methods are advantageous, for example, because they can be used to mitigate interference from existing satellite gateway antennas without modifying the structure of the existing satellite gateway antennas. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method for mitigating interference from a satellite gateway antenna, the method comprising:

determining a power flux density radiation from the satellite gateway antenna in at least one direction in a horizontal plane;

mounting at least one panel at an area in the at least one direction in the horizontal plane;

orienting the at least one panel to have an azimuthal rotation relative to a look direction of the satellite gateway antenna in the horizontal plane; and orienting the at least one panel to have an upward tilt such that any reflection of horizontal rays of the power flux density radiation off of the at least one panel is not in the horizontal plane.

2. The method of claim 1, wherein determining the power flux density radiation from the satellite gateway antenna comprises creating a power flux density contour of an area surrounding the satellite gateway antenna.

3. The method of claim 1, wherein determining the power flux density radiation from the satellite gateway antenna comprises determining the power flux density radiation in an area comprising a base station using a 5G service.

4. The method of claim 1, comprising mounting the at least one panel on a side of the satellite gateway antenna to reduce a back lobe of radiation extending behind the satellite gateway antenna.

5. The method of claim 1, comprising mounting the at least one panel in front of the satellite gateway antenna to reduce a front lobe of radiation extending in front of the satellite gateway antenna at or near a look direction of the satellite gateway antenna.

6. The method of claim 1, comprising mounting the at least one panel in a direction of a base station operating using a 5G service.

7. The method of claim 1, wherein mounting the at least one panel comprises mounting a first panel to reduce a back lobe of radiation extending behind the satellite gateway antenna and mounting a second panel to reduce a front lobe of radiation extending in front of the satellite gateway antenna.

8. A satellite communication system comprising:

a satellite gateway antenna producing a power flux density radiation in at least one direction in a horizontal plane; and at least one panel mounted at an area in the at least one direction in the horizontal plane of the power flux density radiation, the at least one panel oriented to have an azimuthal rotation relative to a look direction of the satellite gateway antenna in the horizontal plane.

9. The system of claim 8, wherein the at least one panel comprises a panel located on a side of the satellite gateway antenna to reduce a back lobe of radiation extending behind the satellite gateway antenna.

10. The system of claim 8, wherein the at least one panel comprises two panels located on opposite sides of the satellite gateway antenna to reduce back lobes of radiation extending behind the satellite gateway antenna on the opposite sides of the satellite gateway antenna.

11. The system of claim 8, wherein the at least one panel comprises a panel located in front of the satellite gateway antenna to reduce a front lobe of radiation extending in front of the satellite gateway antenna at or near the look direction of the satellite gateway antenna.

12. The system of claim 8, wherein the at least one panel comprises a first panel and a second panel, the first panel is positioned and arranged to reduce a back lobe of radiation extending behind the satellite gateway antenna, and the second panel is positioned and arranged to reduce a front lobe of radiation extending in front of the satellite gateway antenna at or near the look direction of the satellite gateway antenna.

13. The system of claim 8, wherein the at least one panel is mounted on a separate support structure than the satellite gateway antenna.

14. The system of claim 8, wherein the at least one panel is oriented to have an upward tilt such that any reflection of horizontal rays of the radiation off of the at least one panel is not in the horizontal plane.

15. A satellite communication system comprising:

a satellite gateway antenna producing a power flux density radiation in at least one direction in a horizontal plane; and at least one panel mounted at an area in the at least one direction in the horizontal plane of the power flux density radiation, the at least one panel oriented to have an upward tilt such that any reflection of horizontal rays of the power flux density radiation off of the at least one panel is not in the horizontal plane.

16. The system of claim 15, wherein the at least one panel comprises a panel located on a side of the satellite gateway antenna to reduce a back lobe of radiation extending behind the satellite gateway antenna.

17. The system of claim 15, wherein the at least one panel comprises two panels located on opposite sides of the satellite gateway antenna to reduce back lobes of radiation extending behind the satellite gateway antenna on the opposite sides of the satellite gateway antenna.

18. The system of claim 15, wherein the at least one panel comprises a panel located in front of the satellite gateway antenna to reduce a front lobe of radiation extending in front of the satellite gateway antenna at or near a look direction of the satellite gateway antenna.

19. The system of claim 15, wherein the at least one panel comprises a first panel and a second panel, the first panel is positioned and arranged to reduce a back lobe of radiation extending behind the satellite gateway antenna, and the second panel is positioned and arranged to reduce a front lobe of radiation extending in front of the satellite gateway antenna at or near a look direction of the satellite gateway antenna.

20. The system of claim 15, wherein the at least one panel is mounted on a support structure separate from that of the satellite gateway antenna.

* * * * *